United States Patent [19]

Denzinger et al.

[11] Patent Number: 4,818,795

[45] Date of Patent: Apr. 4, 1989

[54] POLYMALEIC ACID, ITS PREPARATION AND ITS USE

[75] Inventors: Walter Denzinger, Speyer; Heinrich Hartmann, Limburgerhof; Ulrich Göeckel, Boehl-Iggelheim; Felix Richter, Bruehl; Ekhard Winkler, Mutterstadt; Hans-Jüergen Raubenheimer, Ketsch, all of Fed. Rep. of Germany

[73] Assignee: BASF Aktiengesellschaft, Ludwigshafen, Fed. Rep. of Germany

[21] Appl. No.: 92,852

[22] Filed: Sep. 3, 1987

[30] Foreign Application Priority Data

Sep. 19, 1986 [DE] Fed. Rep. of Germany ....... 3631815

[51] Int. Cl.$^4$ ................................................ C08F 8/12
[52] U.S. Cl. ................................ 525/327.8; 525/366; 525/368; 525/369; 526/227; 526/232; 526/232.3; 526/232.5; 526/271; 526/272; 549/477
[58] Field of Search ............... 525/327.8, 366, 368, 525/369; 526/227, 232, 232.3, 232.5

[56] References Cited

U.S. PATENT DOCUMENTS

| | | | |
|---|---|---|---|
| 4,097,408 | 6/1978 | Sanchez | 526/228 |
| 4,283,499 | 8/1981 | Howell | 526/227 |
| 4,429,092 | 1/1984 | Sterling | 526/221 |
| 4,705,888 | 11/1987 | Meijer et al. | 526/227 |

Primary Examiner—Joseph L. Schofer
Assistant Examiner—Bernard Lipman
Attorney, Agent, or Firm—John C. Demeter; Joseph D. Michaels

[57] ABSTRACT

A process for the preparation of polymaleic acid by polymerizing maleic anhydride in an aromatic hydrocarbon at from 60° to 200° C., using from 1 to 20% by weight, based on maleic anhydride, of peroxyesters derived from saturated or ethylenically unsaturated carboxylic acids, as the polymerization initiators and hydrolyzing the polymer, the polymaleic acid thus obtained and the use of the polymaleic acid as an agent for reducing scale formation and hard water deposits in systems through which water flows.

6 Claims, No Drawings

POLYMALEIC ACID, ITS PREPARATION AND ITS USE

British Pat. No. 1,024,725 discloses a process for the preparation of polymaleic anhydride wherein maleic anhydride is polymerized in an inert solvent, eg. a dialkylether, tetrahydrofuran, dioxane, benzene or a chlorohydrocarbon, such as chloroform, in the presence of an organic percarbonate or diacyl peroxide. Particularly preferred solvents are benzene and chloroform. Examples of polymerization initiators used are diisopropyl percarbonate, dibenzoyl peroxide and dicyclohexyl percarbonate in amounts of from 2 to 40% by weight, based on maleic anhydride. The polymers thus prepared contain substantial amounts of unpolymerized maleic anhydride.

In the process of British Pat. No. 1,411,063, polymaleic anhydride is obtained by polymerizing maleic anhydride in xylene, containing up to 99% of ortho-xylene, as the solvent, with from 15 to 40% by weight, based on maleic anhydride, of di-tert.-butyl peroxide as the polymerization initiator. The polymers prepared by this process again contain substantial amounts of unpolymerized maleic anhydride.

U.S. Pat. No. 3,810,834 discloses that hydrolyzed polymaleic anhydrides having a molecular weight of from 300 to 5,000 before hydrolysis, or water-soluble salts of such hydrolyzed polymaleic anhydrides, may be employed in water treatment, thereby reducing and in many cases virtually preventing scale formation. Polymers suitable for this purpose are prepared by polymerizing maleic anhydride in toluene, with benzoyl peroxide, and subsequently hydrolyzing the polymaleic anhydride thus obtained. Since the polymerization of the maleic anhydride is incomplete and the removal of unpolymerized maleic anhydride from the polymer is difficult, the polymaleic acids contain substantial amounts of maleic acid.

It is an object of the present invention to provide a process for the preparation of polymaleic acid which yields polymers whose free maleic acid content is substantially less than the maleic acid content of the known polymaleic acids. It is a further object of the invention to provide products which are more efficient than previously used polymaleic acids in reducing scale formation and hard water deposits in systems through which water flows.

We have found that these objects are achieved, according to the invention, by a process for the preparation of polymaleic acid by polymerizing maleic anhydride in an aromatic hydrocarbon at from 60° to 200° C. in the presence of polymerization initiators, and hydrolyzing the polymers, wherein from 1 to 20% by weight, based on maleic anhydride, of peroxyesters derived from saturated or ethylenically unsaturated carboxylic acids are employed as polymerization initiators. The polymaleic acids obtained by this process are effective water treatment agents for preventing scale formation or hard water deposits in systems through which water flows.

In the process according to the invention, maleic anhydride is polymerized in an aromatic hydrocarbon or in a mixture of such hydrocarbons. Examples of suitable aromatic hydrocarbons are benzene, toluene, xylene, ethylbenzene, isopropylbenzene, n-propylbenzene, o-, m- and p-diethylbenzene, p-diisopropylbenzene and tetralin. All isomers of xylene (o-, m- and p-xylene) may be employed, either in pure form or as mixtures commercially available as technicalgrade xylene. Preferred aromatic hydrocarbons are toluene and o-xylene.

The polymerization initiators used according to the invention are peroxyesters which are formally derived from saturated or ethylenically unsaturated carboxylic acids. The primary esters of the peracids are in general prepared by reacting the barium salts of primary alkyl hydroperoxides with acyl chlorides, while the tertiary alkyl esters of the peracids are obtainable by simultaneously adding dilute alkali and acyl chloride to a tert.-alkyl hydroperoxide. The carboxylic acid moiety of the peroxyester molecule is derived from saturated $C_1$–$C_{18}$-carboxylic acids or from ethylenically unsaturated $C_3$–$C_{18}$-carboxylic acids, preferably from saturated or ethylenically unsaturated carboxylic acids of 4 to 10 carbon atoms. The suitable peroxyesters can, in a simplified way, be represented by the following formulae:

(I)

or

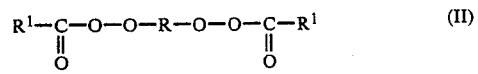
(II)

In formulae I and II, $R_1$ is a saturated $C_1$–$C_{17}$-alkyl radical or aryl radical, H or an ethylenically unsaturated $C_2$–$C_{17}$-alkenyl radical which may or may not additionally possess a carboxyl group.

The substituent R in formulae I is $C_3$–$C_{22}$-alkyl or alkyl possessing one or more aromatic substituents, eg. cumyl. In formula II R is $C_2$–$C_{22}$-alkylene, while in formula I R is preferably tert.-butyl or tert.-amyl.

Examples of the appropriate alkyl or aralkyl peroxyesters of carboxylic acids are cumyl perneodecanoate, tert.-butyl perneodecanoate, tert.-amyl perneodecanoate, tert.-amyl perpivalate, tert.-butyl perpivalate, tert.-butyl perneohexanoate, tert.-butyl perisobutyrate, tert.-butyl per-2-ethylhexanoate, tert.-butyl perisononanoate, tert.-butyl permaleate, tert.-butyl perbenzoate, 2,5-dimethylhexyl 2,5-diperbenzoate and tert.-butyl per-3,5,5-trimethylhexanoate. The said alkyl peresters may be employed in the polymerization either singly or as mixtures. Preferably, tert.-butyl perpivalate, tert.-butyl per-2-ethylhexanoate or tert.-butyl perbenzoate are employed as sole initiators or as mixtures with one another or as mixtures with other alkyl peroxyesters. From 1 to 20, preferably from 5 to 16, % by weight of the peroxyesters, based on the maleic anhydride employed in the polymerization, are used.

First, polymaleic anhydride is prepared by dissolving maleic anhydride in an aromatic hydrocarbon and then polymerizing it by adding one or more peroxyesters. The concentration of the maleic anhydride in the solution of the aromatic hydrocarbon is from 20 to 80, preferably from 30 to 70, % by weight, ie. from 0.25 to 4, preferably from 0.43 to 2.33, parts by weight of an aromatic hydrocarbon are used per part by weight of maleic anhydride. The polymerization takes place at from 60 to 200° C. and is preferably carried out at from 80 to 150° C. In relatively small batches, in which the heat of polymerization can easily be removed, it is possible to polymerize a solution of maleic anhydride in the aromatic hydrocarbon, which furthermore contains a polymerization initiator to be employed according to the invention, by heating at a temperature within the stated range. However, it is more advantageous first to introduce a solution of maleic anhydride in one or more aromatic hydrocarbons into a reactor, heat the solution to the temperature required for the polymerization and introduce the peroxyester, dissolved in an aromatic solvent or in an inert solvent, continuously or a little at a time, as the polymerization reaction progresses. In another embodiment of the process, the aromatic hydrocarbon is heated to a temperature in the stated range and maleic anhydride and polymerization initiator are introduced continuously or batchwise in step with the progress of the polymerization.

However, the polymerization can also be carried out by heating a portion of the mixture to be polymerized, for example from 5 to 10% of the total batch, in a polymerization reactor to 60-200° C., so that the polymerization starts, and then introducing the remainder of the components to be polymerized, either as a mixture (mixture of maleic anhydride and peroxyester dissolved in the aromatic hydrocarbon) or as separate solutions of maleic anhydride and peroxyester in an aromatic hydrocarbon, continuously or batchwise into the initial charge which has been heated to the polymerization temperature. The polymerization is preferably carried out under an inert gas atmosphere, for example under nitrogen. The technically simplest way of removing the heat formed during the polymerization is to carry out the polymerization at the boiling point of the aromatic hydrocarbon, because the heat can then be removed from the system by evaporative cooling. Use of a mixture of several aromatic hydrocarbons in that case permits bringing the system to the desired polymerization temperature. If on the other hand the polymerization is to be carried out in a single aromatic hydrocarbon, for example in toluene, it is also possible, in order to employ evaporative cooling, to carry out the polymerization under reduced or superatmospheric pressure. In addition to the substantially batchwise polymerizations described above, the process can, where substantial amounts of polymaleic anhydride are to be produced, also be carried out continuously. The polymerization times are from 1 to 10, preferably from 2 to 8, hours.

In order to produce polymers with a particularly low residual monomer content, the main polymerization may be followed by an after-polymerization, either at the temperature at which the main polymerization was carried out or at a temperature which is from 10 to 40° C. higher. However, in all cases it is necessary to add peroxyesters for the after-polymerization. In total, from 1 to 20% by weight of the peroxyesters is required for the main polymerization and after-polymerization. The total amount of initiator required may be employed in the main polymerization, or from 80 to 95% of the total amount of initiator may be added at that stage, while the remainder of the initiator is added after termination of the main polymerization, whereupon the after-polymerization is carried out.

The conversion of maleic anhydride is more than 99%, so that maleic anhydride polymers containing less than 1% by weight of nonpolymerized maleic anhydride are obtained. The structure of the polymers is not known. However, from the mass balance, elementary analysis and IR spectra it can be concluded that in addition to the co-polymerized maleic anhydride units the polymer also contains, in chemically bonded form, the particular aromatic hydrocarbon used and decomposition products of the peroxyesters. Up to 75, preferably from 10 to 65, % by weight, based on maleic acid, of aromatic hydrocarbons and initiator decomposition products are incorporated into the polymaleic acid in the case of 100% conversion of the maleic anhydride to polymaleic anhydride. In polymerizing the maleic anhydride according to the invention, one obtains, depending on the choice of solvent, clear polymer solutions (eg. in ethylbenzene) or precipitates of the polymers or two separate phases which each contain polymer, the lower phase having an oily consistency above 90° C., and solidifying on cooling. The upper phase essentially consists of a solution (for example, if the polymerization is carried out in xylene). The polymers in the two different phases have different technological properties. However, they can be used conjointly for one and the same purpose, so that separation is not necessary. On the other hand, the polymer batch can also be separated or fractionated, by which method particularly effective water treatment agents can be prepared. The aromatic hydrocarbons not incorporated into the polymer during the polymerization can be recovered and can be reused, even without purification, for a polymerization.

The polymerization of the maleic anhydride is carried out in the absence of water. The aromatic hydrocarbons employed in the polymerization are virtually anhydrous or contain at most 0.2% by weight of water, ie. such amounts as become dissolved in the aromatic hydrocarbon upon contact with water.

In a second process step, the products formed in the polymerization are hydrolyzed. To do this in order to prepare the polymers in the acid form, water is added, and to complete the hydrolysis of the anhydride groups of the polymer the reaction mixture is heated at from 70 to 150° C., the process being carried out under pressure if the temperature is above the boiling point of the solvent-water mixture. The aromatic hydrocarbon employed in the polymerization can be distilled from the resulting aqueous polymer solution either before or after the hydrolysis. If desired, the aqueous solution of the polymaleic acid can be neutralized with alkali, ammonia or an amine. However, the preferred method of preparing the salts of polymaleic acid is to neutralize the reaction mixture, obtained from the polymerization, with an aqueous solution of an alkali metal base, ammonia or an amine. In these cases, again, the aromatic hydrocarbon can be distilled off before, during or after the neutralization. In all these cases, aqueous solutions of salts of polymaleic acid are obtained. The alkali metal bases used are preferably sodium hydroxide or potassium hydrox-ide. The neutralization can furthermore be carried out with ammonia or an amine, for example triethylamine, hexylamine, ethanolamine, triethanolamine or morpholine. The hydrolysis of the anhydride groups of the polymer can however be carried out not only with water but also with aqueous solutions of bases or acids.

The K value of the hydrolyzed polymer is from 7 to 20, preferably from 8.5 to 15 (determined on a 5% strength aqueous solution of the sodium salt at 25° C. and pH 7). The hydrolyzed polymers obtained by the process according to the invention contain less than 1% by weight of monomeric maleic acid (determined polarographically). The aqueous solutions of the hydrolyzed polymers can therefore be used directly, without further purification, for water treatment, so as to prevent or suppress scale formation and hard water deposits in systems through which water flows.

The mode of action of these scale preventatives is that they prevent the formation of crystals of the salts responsible for hardness, such as calcium carbonate, magnesium oxide, magnesium carbonate, calcium sulfate, barium sulfate, strontium sulfate, calcium phosphate (apatite) and the like when added in less than stoichiometric amounts, or influence the formation of these precipitates in such a way that no hard, rock-like scale is formed, but instead deposits which are finely dispersed in water and can easily be flushed out are produced. In this way, the surfaces of, for example, heat exchangers, pipes or pump components are kept free from scale, and their tendency to corrode is reduced. In particular, the danger of pitting corrosion under such scale is reduced. Further, the growth of microorganisms on these metal surfaces is made more difficult. Accordingly, by using such scale preventatives the life of such installations can be increased and the shutdown time required to clean parts of the installation can be substantially reduced. The amounts of scale preventatives required for this purpose are as little as 0.1–100 ppm, based on the amounts of water. The systems through which water flows may be, for example, open or closed cooling circuits, for example of power stations or chemical plant, such as reactors, distillation apparatus and similar components, in which heat has to be removed. These scale preventatives can also be used in boiler water and in steam generators, preferably at water temperatures below 150° C. A further preferred use of the novel scale preventatives is the desalination of seawater and brackish water by distillation or membrane processes, for example reverse osmosis or electrodialysis. For instance, in the MSF distillation process for seawater desalination concentrated seawater is circulated at an elevated temperature. The novel scale preventatives effectively prevent the deposition of compounds responsible for hardness, for example brucite, and their caking onto parts of the installation.

In membrane processes, damage to the membranes by crystallizing-out of the compounds responsible for hardness can be effectively prevented. In this way, such scale preventatives permit higher concentration factors, improved yield of pure water and longer life of the membranes. A further use of these scale preventatives is in, for example, concentration of cane sugar or beet sugar juice. In contrast to the applications described above, the dilute sugar juice in this case has added to it, for example, calcium hydroxide, carbon dioxide, sulfur dioxide or, in some cases, phosphoric acid, for purification. Sparingly soluble calcium salts, for example calcium carbonate, calcium sulfate or calcium phosphate, which remain in the sugar juice after filtration, then precipitate during the evaporation process and can form rock-hard deposits on heat exchanger surfaces. This is also true for substances concomitant with sugar, such as silica or calcium salts of organic acids, eg. oxalic acid.

Similar remarks apply to processes which follow the isolation of the sugar, for example production of alcohol from sugar production residues.

The scale preventatives according to the invention are capable of substantially preventing this scale formation, so that the time for which the plant has to be shut down for cleaning, for example by boiling out, can be substantially reduced. An important aspect is furthermore the substantial energy saving resulting from the prevention of the heat-insulating deposits mentioned.

The amounts of scale preventative required for the applications described differ but are from 0.1 to 100 ppm, based on the cooling water, boiler water, process water or, for example sugar syrup employed.

The hydrolyzed polymers can furthermore be incorporated, in amounts of from 0.5 to 10% by weight, into detergent formulations, to act as crust inhibitors and graying inhibitors. The novel polymaleic acids can also be used as water hardness stabilizers in detergent formulations. They can also be employed, in amounts of from 0.1 to 5% by weight, as dispersants for pigments, for example to produce highly concentrated aqueous slurries of clay or chalk for the production of paper coating compositions.

In the examples, parts and percentages are by weight. The K values of the hydrolyzed polymers were determined by the method of H. Fikentscher, Cellulosechemie, 13 (1932), 48–64 and 71–74, in aqueous solution at a pH of 7, at 25° C., using a 5% by weight concentration of the sodium salt of the polymer.

EXAMPLE 1

233 g of technical grade xylene and 100 g of maleic anhydride are introduced into a glass reactor of 0.5 liter capacity, equipped with a thermometer, nitrogen inlet, condenser, feed vessel and device for introducing steam, and are heated to boiling under reflux, while stirring. The technical grade xylene is a mixture of 15% o-xylene, 68% m- and p-xylene and 17% of ethylbenzene. A solution of 7.5 g of tert.-butyl per-2-ethylhexanoate in 50 g of technical grade xylene is then added continuously, over 2 hours, to the boiling solution of maleic anhydride in xylene. After completion of the initiator addition, the reaction mixture is heated at the boil for a further 4 hours and is then cooled to 90° C. 50 g of water are then added and the unconsumed solvent employed is removed by introducing steam. An aqueous solution having a solids content of 50.9% is obtained. The maleic acid content in the polymaleic acid is 0.16%. In the form of the sodium salt, the polymer has a K value of 9.3. The yield of polymaleic acid is 145%, based on maleic acid, the amount of the latter being calculated from the maleic anhydride employed.

EXAMPLE 2

100 g of technical grade xylene and 100 g of maleic anhydride are introduced into the polymerization apparatus described in Example 1 and are heated to the boil under reflux, while stirring. As soon as refluxing commences, a solution of 10 g of tert.-butyl per-2-ethyl-hexanoate in 50 g of technical grade xylene is added continuously over 2 hours. After the initiator has been added, the polymerization mixture is heated at the boil for a further 4 hours and is then cooled to 90° C. To hydrolyze the polymaleic anhydride, 50 g of water are added and the aromatic hydrocarbons employed in the polymerization are removed by introducing steam. An aqueous solution of 50.6% solids content is obtained. The polymaleic acid thus obtained has, in the form of the sodium salt, a K value of 9.9, and contains 0.15% of unpolymerized maleic acid. The yield of polymaleic acid is 145%, based on maleic acid, the amount of the latter being calculated from the maleic anhydride employed.

EXAMPLE 3

Using the apparatus described in Example 1, a solution of 100 g of maleic anhydride in 100 g of xylene is heated to the boil, under reflux, while stirring, and a solution of 15 g of tert.-butyl per-2-ethylhexanoate in 50 parts of technical grade xylene is added continuously over 2 hours, with thorough mixing. The reaction mixture is then stirred for a further 4 hours at the boil, after which it is cooled to 95° C. 50 g of water are added and the aromatic hydrocarbons used in the polymerization are removed by introducing steam. A clear yellow solution of 49.8% solids content is obtained. This is an aqueous solution of polymaleic acid which, in the form of the sodium salt, has a K value of 9.3. The product contains less than 0.001% of unpolymerized maleic acid, based on solids content. The yield of polymaleic acid is 139%, based on maleic acid, the amount of the latter being calculated from the maleic anhydride employed.

EXAMPLE 4

A solution of 200 g of maleic anhydride in 700 g of technical grade xylene is heated to 100° C., under nitrogen, in a glass reactor of 2 liters capacity, equipped with a stirrer, thermometer, nitrogen inlet, condenser, feed vessels and device for introducing steam. As soon as 100° C. has been reached, a solution of 15 g of tert.-butyl per-2-ethylhexanoate in 100 g of technical grade xylene is introduced over 5 hours. The polymerization temperature is 100° C. After all the initiator has been added, the mixture is heated to the reflux temperature and kept under reflux for 1 hour. It is then cooled to 97° C. and hydrolyzed with 200 g of water. The aromatic hydrocarbons employed in the polymerization are azeotropically distilled off by introducing steam. A clear yellow solution, of 51% solids content, remains. In the form of the Na salt, the polymaleic acid has a K value of 9.2. The residual monomer content, based on solids content, amounts to 0.27% of maleic acid. The yield of polymaleic acid is 165%, based on maleic acid, the amount of the latter being calculated from the maleic anhydride employed.

EXAMPLE 5

600 g of m-xylene and 400 g of maleic anhydride are introduced into the reactor described in Example 4 and are heated to 115° C. under nitrogen, while stirring. As soon as the solution of maleic anhydride in m-xylene has reached 115° C., a solution of 30 g of tert.-butyl per-2-ethylhexanoate in 100 g of m-xylene is added over 5 hours and when all the initiator has been introduced, the reaction mixture is heated to the reflux temperature, at which the after-polymerization is allowed to take place for 1 hour. The reaction mixture is then cooled to 93° C., 200 g of water are added to hydrolyze the product, and the m-xylene is removed azeotropically by introducing steam. A clear yellow aqueous solution of 53.5% solids content is obtained. In the form of the sodium salt, the polymaleic acid has a K value of 9.5. The content of unpolymerized maleic acid is 0.48%, based on solids content. The yield of polymaleic acid is 125%, based on maleic acid, the amount of the latter being calculated from maleic anhydride employed.

EXAMPLE 6

600 g of o-xylene and 400 g of maleic anhydride are introduced into the reactor described in Example 4 and heated to the boil under nitrogen. As soon as refluxing commences, a solution of 60 g of tert.-butyl per-2-ethylhexanoate in 100 g of o-xylene is added continuously over 5 hours. When all the initiator has been added, the reaction mixture is after-polymerized for 1 hour under reflux and then cooled to 94° C. 200 g of water are added to hydrolyze the polymer formed, and the o-xylene is removed azeotropically by introducing steam. A clear aqueous solution of 58.1% solids content remains. In the form of the Na salt, the polymaleic acid thus produced has a K value of 9.6. The content of unpolymerized maleic acid is 0.11%, based on solids. The yield of polymaleic acid is 126%, based on maleic acid, the amount of the latter being calculated from maleic anhydride employed.

EXAMPLE 7

A solution of 400 g of maleic anhydride in 600 g of ethylbenzene is heated to 115° C. in the apparatus described in Example 4. The polymerization is then performed at this temperature by continuously introducing, into the initial charge, a solution of 30 g of tert.-butyl per-2-ethylhexanoate in 100 g of ethylbenzene over 5 hours. After all the initiator has been added, the reaction mixture is after-polymerized for 1 hour at 115° C. and then cooled to 97° C., and 200 g of water are added to hydrolyze the product. The ethylbenzene employed in the polymerization is removed by azeotropic distillation. A clear yellow aqueous solution is obtained from which crystals separate out at room temperature, and which has a solids content of 50.8%. The K value of the polymaleic acid is 9.0. 0.11%, based on solids, of unpolymerized maleic acid is found to be present. The yield of poly-maleic acid is 155%, based on maleic acid, the amount of the latter being calculated from maleic anhydride employed.

EXAMPLE 8

1,500 g of toluene and 1,000 g of maleic acid are heated to 140° C. under nitrogen pressure in a stainless steel reactor of 6 liters capacity, which is designed for operating under pressure and is equipped with a thermometer, nitrogen inlet, condenser, feed vessel and device for introducing steam. The pressure is 3 bar. When the initial charge has reached 140° C., a solution of 150 g of tert.-butyl per-2-ethylhexanoate in 250 ml of toluene is introduced continuously over 5 hours. During the polymerization, the temperature is kept at 140° C. and after completion of initiator addition the reaction mixture is heated at this temperature for a further hour. The reactor contents are then allowed to cool to 95° C., 500 g of water are added and the toluene which was employed in the polymerization and has not been consumed is distilled off azeotropically by introducing steam. A solution which is clear and brownish at 40° C., has a solids content of 50.6% and deposits crystals upon cooling to room temperature is obtained. In the form of the Na salt, the polymaleic acid thus prepared has a K value of 9.6. The monomeric maleic acid content is 0.13%, based on solids.

EXAMPLE 9

A solution of 1,000 g of maleic anhydride in 1,500 g of toluene is introduced into the reactor described in Example 8 and is heated to 140° C. in a nitrogen atmosphere, the pressure rising to 3 bar. polymerization is carried out over 5 hours by introducing a solution of 100 g of tert.-butyl per-2-ethylhexanoate in 250 g of toluene. After completion of initiator addition the reaction mixture is stirred at 140° C. for a further hour and then cooled to 95° C. 500 g of water are added and the unconsumed toluene is removed by introducing steam. A clear brownish aqueous polymer solution is obtained, from which crystals deposit at room temperature and which has a solids content of 51%. In the form of the Na salt, the polymaleic acid thus prepared has a K value of 9.4. The content of unpolymerized maleic acid is 0.25%, based on solids.

EXAMPLE 10

A solution of 100 g of maleic anhydride in 100 g of technical grade xylene is heated to the boil in the reactor described in Example 1 and a solution of 15 g of tert.-butyl perbenzoate in 50 g technical grade xylene is added continuously over 2 hours, under a nitrogen atmosphere. The reaction mixture is then after-polymerized at the boiling point of the technical grade xylene for 4 hours, after which it is cooled to 95° C., and 50 g of water are added. The aromatic hydrocarbons are then removed by steam distillation. A clear brownish aqueous solution of polymaleic acid, of 50.5% solids content, remains. In the form of the Na salt, the polymaleic acid has a K value of 10.1. The content of unpolymerized maleic acid is 0.03%, based on solids. The yield of polymaleic acid is 145%, based on maleic acid, the amount of the latter being calculated from maleic anhydride employed.

EXAMPLE 11

A solution of 100 g of maleic anhydride in 100 g of technical grade xylene is heated to 100° C. in the reactor described in Example 1. When this temperature has been reached, a solution of 7.5 g of tert.-butyl perpivalate (75% strength in aliphatics) in 50 g of technical grade xylene is added over 5 hours. When all the initiator has been added, the reaction mixture is heated to 140° C. and after-polymerized for one hour at this temperature. It is then cooled to 95° C., 50 g of water are added and the aromatic hydrocarbons are removed by introducing steam. A clear light brown aqueous solution of polymaleic acid, of 53.7% solids content, is obtained. In the form of the Na salt, the K value of the polymaleic acid thus produced is 10.8. The content of unpolymerized maleic acid is 0.28%. The yield of polymaleic acid is 140%, based on maleic acid, the amount of the latter being calculated from maleic anhydride employed.

COMPARATIVE EXAMPLE 1

A solution of 300 g of maleic anhydride in 300 g of technical grade xylene is heated under reflux, with stirring, in the polymerization reactor described in Example 4, until the solution begins to boil. As soon as this is the case, a solution of 100 g of di-tert.-butyl peroxide dissolved in 150 g of technical grade xylene is added continuously over 2 hours. As the polymerization progresses, the boiling point of the reaction mixture drops from 136° to 125° C. When all the initiator has been added, the reaction mixture is after-polymerized for 4 hours at 125° C., then cooled to 95° C. and hydrolyzed by adding 300 g of water. The aromatic hydrocarbons which were used as the solvent and were not incorporated into the polymer are removed azeotropically by introducing steam. A clear brown aqueous solution of polymaleic acid, of 48.7% solids content, is obtained. In the form of the sodium salt, the polymaleic acid has a K value of 10.1. The content of unpolymerized maleic acid is 4.1%, based on solids in the aqueous solution.

COMPARATIVE EXAMPLE 2

Comparative Example 1 is repeated except that instead of the initiator solution used therein, a solution of 45 g of di-tert.-butyl peroxide in 150 g of technical grade xylene is employed. This results in a deep brown clear aqueous solution which contains 86% of unpolymerized maleic acid, based on solids.

COMPARATIVE EXAMPLE 3

A solution of 300 g of maleic anhydride in 300 g of o-xylene is polymerized in the apparatus described in Example 4. The solution is heated to the boil and a solution of 100 g of di-tert.-butyl peroxide in 150 g of o-xylene is added continuously over 2 hours to the boiling solution. The boiling point of the reaction mixture drops from 146° to 127° C. as the polymerization progresses. When all the initiator has been run in, the reaction mixture is refluxed for a further 4 hours and then cooled to 95° C., and 300 g of water are added to hydrolyze the product. The o-xylene used as the solvent is then removed by steam distillation. A clear brown aqueous solution of polymaleic acid, of 62.4% solids content, is obtained. The residual monomer content is 18.5%, based on solids.

COMPARATIVE EXAMPLE 4

A solution of 877 g of maleic anhydride in 877 g of technical grade xylene is heated to the boil, under reflux, in a reactor of 4 liters capacity, equipped with a stirrer, thermometer, nitrogen inlet, condenser, feed vessel and device for introducing steam. As soon as the solution begins to boil, a solution of 292 g of tert.-butyl hydroperoxide in 350 g of technical grade xylene is added continuously over 2 hours, under a nitrogen atmosphere and with constant stirring. When all the initiator has been added, the mixture is boiled for a further 4 hours and then cooled to 96° C., 600 g of water are added and the batch is then subjected to steam distillation to remove the technical grade xylene. A clear brown aqueous solution of 55.9% solids content results. The content of unpolymerized maleic acid is 10.5%, based on solids.

COMPARATIVE EXAMPLE 5

A solution of 100 g of maleic anhydride in 100 g of technical grade xylene is heated to the boil under nitrogen, with stirring, in the apparatus described in Example 1, and a solution of 15 g of tert.-butyl hydroperoxide in 50 g of technical grade xylene is added continuously over 2 hours. When all the initiator has been added, the reaction mixture is boiled for a further 4 hours and then cooled to 94° C., 50 g of water are added and the batch is subjected to a steam distillation. A clear brown solution of 56.5% solids content is obtained. The content of unpolymerized maleic acid is 34.2%, based on solids.

COMPARATIVE EXAMPLE 6

Comparative Example 5 is repeated except that instead of the initiator solution employed therein, a solution of 15 g of dicumyl peroxide in 50 g of technical grade xylene is now used. A clear brown aqueous solution of 54.3% solids content is obtained. The maleic acid content of the polymer solution is 30%, based on solids.

COMPARATIVE EXAMPLE 7

A solution of 400 g of maleic anhydride in 600 g of o-xylene is introduced into the apparatus described in Example 4 and heated to the boil under a stream of nitrogen, with stirring. As soon as the solution begins to boil, a solution of 60 g of dilauroyl peroxide in 200 g of o-xylene is added continuously over 5 hours. When all the initiator has been added, the reaction mixture is boiled for a further hour and then cooled to 95° C., and 300 g of water are added to hydrolyze the polymer. The unconverted o-xylene is removed by steam distillation. A clear yellow aqueous solution of 51% solids content results. The aqueous solution contains 23% of maleic acid, based on solids.

COMPARATIVE EXAMPLE 8

A solution of 100 g of maleic anhydride in 233 g of technical grade xylene is heated to the boil under nitrogen, in the apparatus described in Comparative Example 5, with thorough mixing, and while it boils a solution of 7.5 g of 2,2'-azobisisobutyronitrile in 50 g of technical grade xylene is added over 2 hours. The polymerization is carried out at the boil of the reaction mixture. When all the initiator has been added, the reaction mixture is boiled for a further 4 hours and then cooled to 97° C., 50 g of water are added and a steam distillation is performed. A clear reddish brown aqueous solution of 54.2% solids content results. The aqueous polymer solution contains 13.3% of maleic acid, based on solids.

COMPARATIVE EXAMPLE 9

Comparative Example 8 is repeated except that the polymerization initiator used is a solution of 7.5 g of 2,2'-azobis(2,4-dimethylvaleronitrile) in 50 g of technical grade xylene. A clear reddish brown aqueous polymer solution of 56.3% solids content is obtained. The maleic acid content is 42.9%, based on solids.

COMPARATIVE EXAMPLE 10

Comparative Example 7 is repeated except that in place of the initiator solution described there, an initiator solution of 60 g of methyl ethyl ketone peroxide in 100 g of o-xylene is employed. This gives a blackish brown aqueous solution of 53.1% solids content. The solution contains 78.4% of maleic acid, based on solids.

The comparative examples show clearly that using the polymerization initiators described in the prior art for the polymerization of maleic anhydride, polymers with high residual monomer content are obtained. The residual monomer content of the aqueous polymer solutions obtained according to Comparative Examples 2 to 10 was so high as to make a determination of the K value impossible. The comparative examples however also show that substantial amounts of di-tert.-butyl peroxide are required for the polymerization of maleic anhydride if a reasonably satisfactory conversion during polymerization is to be obtained at all. In contrast, using the peroxyesters according to the present invention, a conversion of more than 99% is achieved in the polymerization of maleic anhydride. The content of maleic acid in the hydrolyzed products is in all cases less than 1%. The high conversions achieved with the process according to the invention, and the low content of maleic acid in the hydrolyzed polymers, is achieved, surprisingly, with a smaller amount of initiator than that used in the prior art.

USE EXAMPLES

Test methods

CaCO3 inhibition, determined dynamically

This test simulates the formation of calcium carbonate scale in a cooling circuit. In this test method, test water of 30° Ca German hardness, 10° Mg German hardness and 56° carbonate German hardness is pumped for 2 hours, at a flow rate of 0.5 l/h, through a glass spiral heated to 75° C. The scale formed in the spiral is dissolved out and Ca+Mg are determined complexometrically. The inhibitor action is calculated from the amount of scale in a blank experiment and in the presence of the appropriate amount of scale inhibitor.

Ca-phosphate dispersion

This test serves to determine the dispersing action on precipitates which have deposited. Test water containing 500 ppm of calcium phosphate precipitate is kept at pH 8.5–9 and 100° C. for 1 hour and is then transferred into a measuring cylinder. After 1 hour, the Ca content in the middle of the measuring cylinder is determined complexometrically. The dispersing action is calculated from the amount of dispersed calcium phosphate in the blank experiment and in the present of the dispersant.

Screening test on seawater deslination

Synthetic seawater (200 ml) according to DIN 50,900 (1960), having an initial salt concentration of 6.15%, is evaporated at 95° C. until it becomes visibly cloudy. The volume obtained is a measure of the effectiveness of the scale inhibitor.

EXAMPLE 12

The polymaleic acid obtained according to Example 6 was examined using the test methods described above. For calcium carbonate inhibition (dynamic method), a value of 83.3% was found on adding 2 ppm of polymaleic acid to the water.

For calcium phosphate dispersion, a value of 99.3% was found on adding 30 ppm of polymaleic acid, 99.9% with 45 ppm and 99.9% again with addition of 60 ppm.

In the seawater evaporation test, using 0.5 ppm of the polymaleic acid of Example 6, the volume at which clouding became perceptible was found to be 114 ml.

COMPARATIVE EXAMPLE 11

Polymaleic acid obtained according to Comparative Example 1 was examined by the test methods described above. Calcium carbonate inhibition was 68.5% when 2 ppm of active substance were added.

For calcium phosphate dispersion, a value of 2.1% was found on addition of 30 ppm, 55.0% on addition of 45 ppm and 62.9% on addition of 60 ppm.

In the seawater evaporation test, on addition of 0.5 ppm of the polymaleic acid according to Comparative Example 1, the volume at which clouding became discernible was found to be 129 ml.

We claim:

1. A process for the preparation of polymaleic acid by polymerizing maleic anhydride in an aromatic hydrocarbon at from 60 to 200° C. in the presence of polymerization initiators, and hydrolyzing the polymers, wherein from 1 to 20% by weight, based on maleic anhydride, of peroxyesters derived from saturated or ethylenically unsaturated carboxylic acids are employed as polymerization initiators.

2. A process as claimed in claim 1, wherein the polymerization is carried out in benzene, toluene, xylene, ethylbenzene, diethylbenzene, isopropylbenzene, diisopropylbenzene or mixtures thereof at from 80 to 150° C. in the presence of peroxyesters derived from saturated $C_4$-$C_{10}$-carboxylic acids.

3. A process as claimed in claim 1, wherein the polymerization initiator is employed in an amount of from 5 to 16% by weight, based on maleic anhydride.

4. A process as claimed in claim 1, wherein the polymerization initiator employed is tert.-butyl per-2-ethylkexanoate, tert.-butyl perpivalate or tert.-butyl perbenzoate or a mixture of these.

5. A process as claimed in claim 1, wherein tert.-butyl permaleate is employed as the polymerization initiator.

6. A polymaleic acid obtained by the process as claimed in claim 1.

* * * * *